(12) United States Patent
Kang et al.

(10) Patent No.: US 11,725,449 B2
(45) Date of Patent: Aug. 15, 2023

(54) VEHICLE DOOR OPENING AND CLOSING CONTROL SYSTEM AND METHOD BASED ON WEATHER STATE DETECTED BY RAIN SENSOR

(71) Applicants: Hyundai Motor Company, Seoul (KR); Kia Corporation, Seoul (KR)

(72) Inventors: Kwan Hui Kang, Hwaseong-si (KR); Chang Woo Sohn, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 42 days.

(21) Appl. No.: 17/472,218

(22) Filed: Sep. 10, 2021

(65) Prior Publication Data

US 2022/0316257 A1   Oct. 6, 2022

(30) Foreign Application Priority Data

Apr. 6, 2021   (KR) .................. 10-2021-0044469

(51) Int. Cl.
| | | |
|---|---|---|
| *G08B 21/00* | (2006.01) | |
| *E05F 15/659* | (2015.01) | |
| *E05B 81/78* | (2014.01) | |
| *E05F 15/77* | (2015.01) | |
| *E05F 15/71* | (2015.01) | |

(52) U.S. Cl.
CPC ............ *E05F 15/659* (2015.01); *E05B 81/78* (2013.01); *E05F 15/71* (2015.01); *E05F 15/77* (2015.01); *E05Y 2900/531* (2013.01)

(58) Field of Classification Search
CPC ......... E05F 15/659; E05F 15/71; E05F 15/77; E05B 81/78; E05Y 2900/531

USPC ......................................................... 340/5.72
See application file for complete search history.

(56) References Cited

U.S. PATENT DOCUMENTS

| | | | |
|---|---|---|---|
| 9,797,181 B2 | 10/2017 | Wheeler et al. | |
| 9,956,940 B2 | 5/2018 | Ette | |
| 10,053,903 B2 | 8/2018 | Ette | |
| 10,358,857 B2 | 7/2019 | Wheeler et al. | |
| 2006/0260665 A1* | 11/2006 | Teshima | B60J 7/0573 135/88.09 |
| 2010/0106345 A1* | 4/2010 | Hwang | G07C 5/008 701/2 |
| 2015/0116085 A1* | 4/2015 | Juzswik | B60R 25/24 340/5.72 |
| 2015/0159419 A1 | 6/2015 | Van Wiemeersch et al. | |
| 2016/0277023 A1* | 9/2016 | Nakajima | H03K 17/9625 |

(Continued)

FOREIGN PATENT DOCUMENTS

KR   10-2017-0067104 A   6/2017

*Primary Examiner* — Mark S Rushing
(74) *Attorney, Agent, or Firm* — Morgan, Lewis & Bockius LLP

(57) ABSTRACT

A vehicle door opening and closing control system may include an antenna provided at a vehicle, the antenna being configured to wirelessly communicate with a user's mobile device to recognize the location of the user's mobile device, a door opening and closing device configured to open or close a door of the vehicle, a rain sensor configured to detect a rainy weather state outside the vehicle, and a controller configured to control the operation of the door opening and closing device based on the location of the mobile device recognized by the antenna or the rainy weather state outside the vehicle detected by the rain sensor.

18 Claims, 5 Drawing Sheets

(56) References Cited

U.S. PATENT DOCUMENTS

| | | |
|---|---|---|
| 2017/0066407 A1 | 3/2017 | Ette |
| 2018/0144570 A1* | 5/2018 | Oomi .................... B60W 40/02 |
| 2020/0300027 A1 | 9/2020 | Brown et al. |
| 2021/0291632 A1* | 9/2021 | Ding ...................... B60J 5/0477 |
| 2022/0089003 A1* | 3/2022 | Ichinose ................... B60J 5/04 |

* cited by examiner (A-A, A'-A' SECTION)

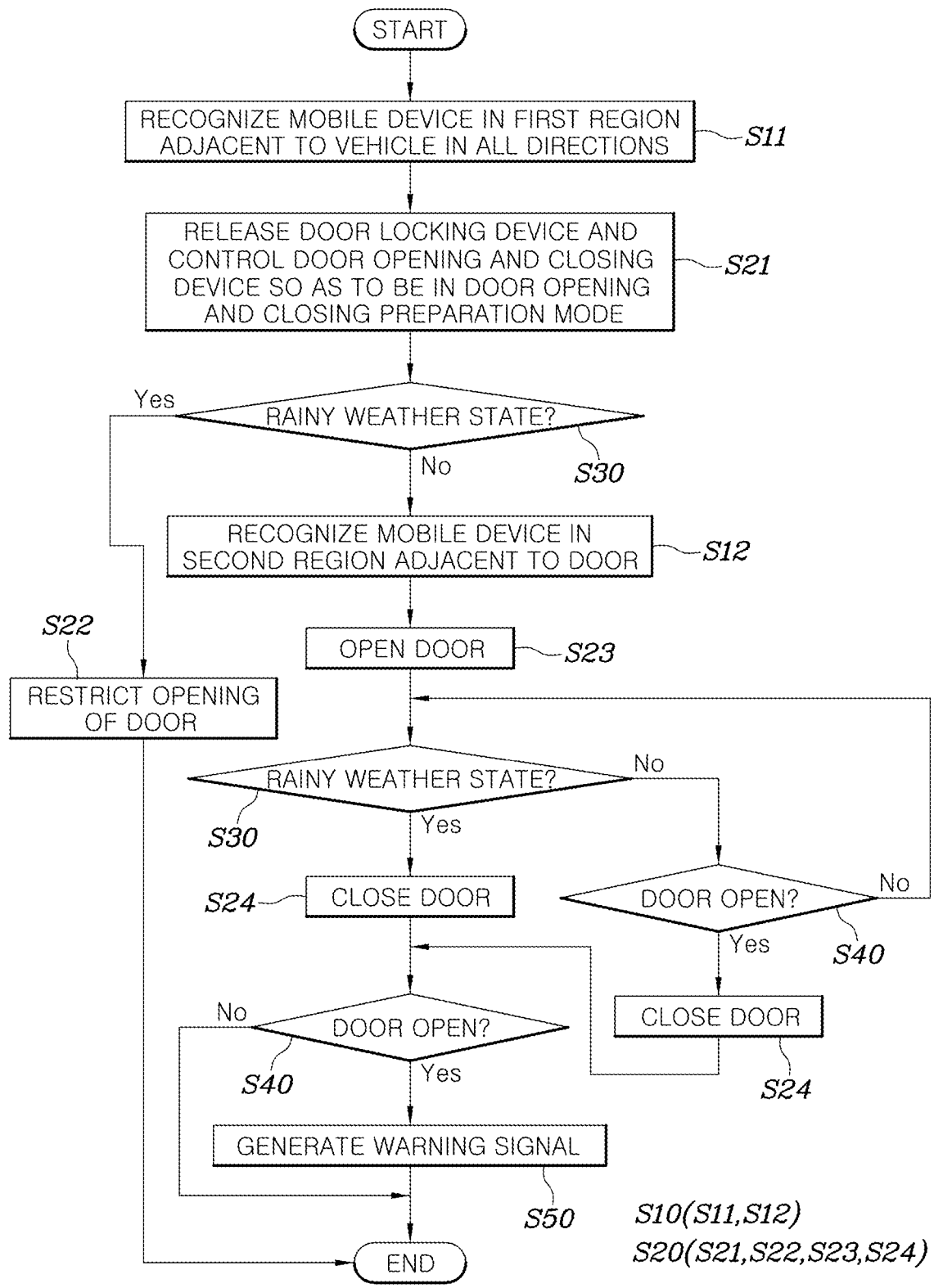

VEHICLE DOOR OPENING AND CLOSING CONTROL SYSTEM AND METHOD BASED ON WEATHER STATE DETECTED BY RAIN SENSOR

CROSS-REFERENCE TO RELATED APPLICATION

The present application claims priority to Korean Patent Application No. 10-2021-0044469, filed on Apr. 6, 2021, with the Korean Intellectual Property Office, the entire contents of which is incorporated herein for all purposes by this reference.

BACKGROUND OF THE INVENTION

Field of the Invention

The present invention relates to a vehicle door opening and closing control system and method, and more particularly to technology for automatically opening and closing a door.

DESCRIPTION OF RELATED ART

In general, a door of a vehicle may be manually opened or closed by a passenger.

With recent technological advances, a door opening and closing device capable of opening or closing the door of the vehicle using a radio frequency (RF) key of the vehicle, a smart key, or a smartphone has been developed.

However, the door opening and closing device is operated by passenger's button manipulation, and therefore a control system capable of automatically opening and closing the door opening and closing device is required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to controlling a door opening and closing device configured to open or close a door of a vehicle based on a mobile device carried by a passenger or a rainy weather state, whereby convenience is provided when the passenger boards or exits the vehicle.

In accordance with an aspect of the present invention, the above and other objects may be accomplished by the provision of a vehicle door opening and closing control system including an antenna provided at a vehicle, the antenna being configured to wirelessly communicate with a user's mobile device to recognize the location of the user's mobile device, a door opening and closing device configured to open or close a door of the vehicle, a rain sensor configured to detect a rainy weather state outside the vehicle, and a controller configured to control the operation of the door opening and closing device based on the location of the mobile device recognized by the antenna or the rainy weather state outside the vehicle detected by the rain sensor.

The antenna may include a first antenna configured to recognize the mobile device in a first region adjacent to the vehicle in all directions of the vehicle, and when the mobile device is recognized in the first region by the first antenna, the controller may be configured to control the door opening and closing device so that a door opening preparation mode of preparing operation of the door opening and closing device is executed.

The antenna may further include a second antenna configured to recognize the mobile device in a second region adjacent to the door of the vehicle, and when the mobile device is recognized in the second region by the second antenna, the controller may be configured to control the door opening and closing device so that the door is opened.

When the door remains open after a predetermined first time in the state in which the door is open, the controller may be configured to control the door opening and closing device so that the door is closed.

The antenna may be configured to detect a third region around the vehicle, and when the mobile device is not recognized in the third region after a predetermined second time in the state in which the door is open, the controller may be configured to control the door opening and closing device so that the door is closed.

When the rain sensor detects a rainy weather state in the state in which the door is open, the controller may be configured to control the door opening and closing device so that the door is closed.

The vehicle door opening and closing control system may further include a warning generation unit configured to generate a warning in the case in which the door remains open when the controller is configured to perform control so that the door is closed.

The vehicle door opening and closing control system may further include a door locking device configured to selectively lock the door of the vehicle, wherein the antenna may include a first antenna configured to recognize the mobile device in a first region adjacent to the vehicle in all directions of the vehicle, and when the mobile device is recognized in the first region by the first antenna, the controller may be configured to control the door locking device so that the door is unlocked.

When the rain sensor detects a rainy weather state, the controller may restrict the operation of the door opening and closing device.

The rain sensor may include an electrode detecting contact with raindrops in rainy weather and a circuit board connected to the controller, the circuit board being configured to convert a signal of the electrode into an electrical signal.

When contact with raindrops is continuously detected for a predetermined third time period after the electrode detects contact with raindrops, the rain sensor may detect that a current state is a rainy weather state.

The rain sensor may further include a sensor housing in which the electrode and the circuit board are received, and the interior of the sensor housing may be filled with a filler.

The mobile device may include an RF key of the vehicle, a smart key, or a smartphone.

In accordance with another aspect of the present invention, there is provided a vehicle door opening and closing control method including wirelessly communicating with a user's mobile device to recognize the location of the user's mobile device, detecting a rainy weather state outside a vehicle, and controlling the operation of a door opening and closing device based on the recognized location of the mobile device or the rainy weather state outside the vehicle.

The step of recognizing the location of the mobile device may include recognizing the mobile device in a first region adjacent to the vehicle in all directions of the vehicle, and when the mobile device is recognized in the first region by the first antenna, the method may further include releasing a door locking device of the vehicle and controlling the door opening and closing device to be in a door opening and closing preparation mode.

After the step of controlling the door opening and closing device to be in the door opening and closing preparation mode, the step of detecting the rainy weather state outside the vehicle may be performed, and when the rainy weather state outside the vehicle is detected, the step of controlling the operation of the door opening and closing device may include performing control so that opening of a door is restricted.

After the step of controlling the door opening and closing device to be in the door opening and closing preparation mode, the step of recognizing the location of the mobile device may include recognizing the mobile device in a second region adjacent to a door, and when the mobile device is recognized in the second region by the second antenna, the step of controlling the operation of the door opening and closing device may include performing control so that the door is opened.

After the step of performing control such that the door is opened, the step of detecting the rainy weather state outside the vehicle may be performed, and when the rainy weather state outside the vehicle is detected, the step of controlling the operation of the door opening and closing device may include performing control so that the door of the vehicle is closed.

After the step of performing control so that the door of the vehicle is opened, the method may further include determining whether the door is open for a predetermined time period, and when the door is open for the predetermined time period, the step of controlling the operation of the door opening and closing device may include performing control so that the door of the vehicle is closed.

After the step of performing control so that the door is closed, the step of determining whether the door is open may be performed again, and when the door is open for the predetermined time period, the method may further include generating a warning signal.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a flowchart of a vehicle door opening and closing control method according to various exemplary embodiments of the present invention.

Figure 1:
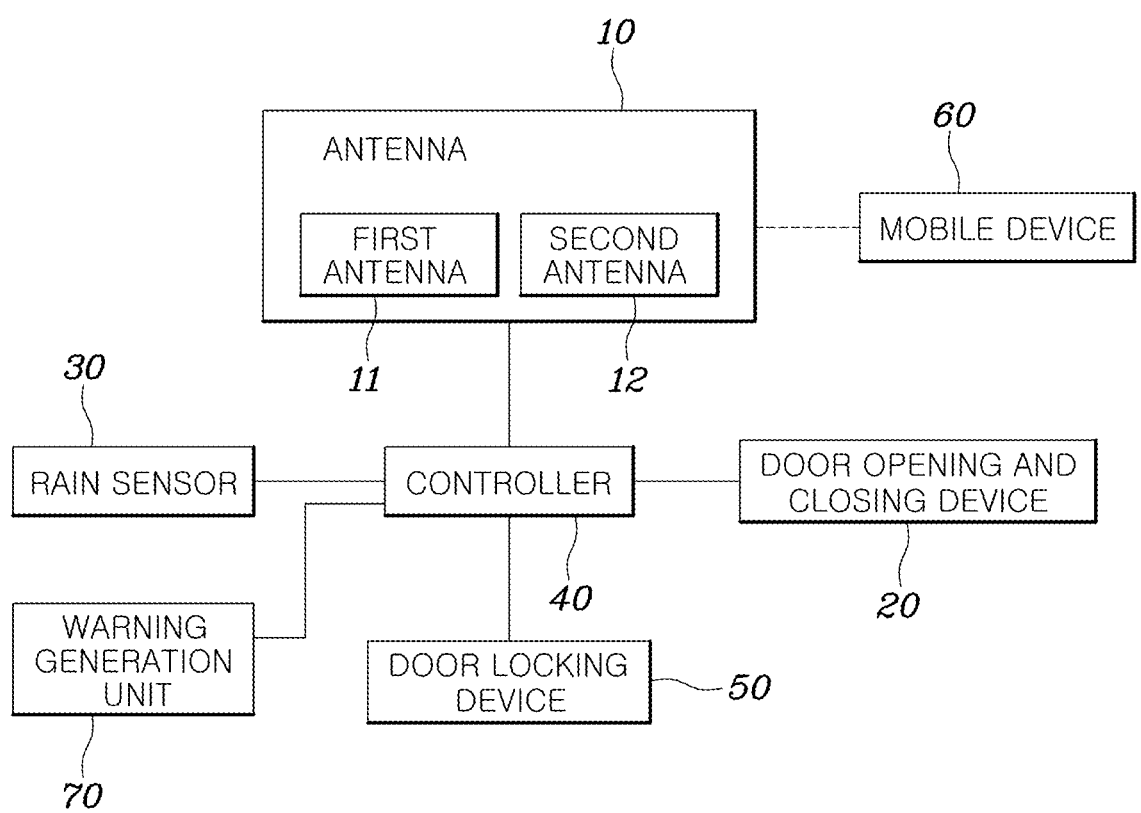
FIG. 1 is a view showing the construction of a vehicle door opening and closing control system according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions of the exemplary embodiments of the present invention disclosed in the present specification or this disclosure are given only for illustrating embodiments of the present invention. Embodiments of the present invention may be realized in various forms, and should not be interpreted to be limited to the exemplary embodiments of the present invention disclosed in the present specification or this disclosure.

Since the exemplary embodiments of the present invention may be variously modified and may have various forms, specific embodiments will be shown in the drawings and will be described in detail in the present specification or this disclosure. However, the exemplary embodiments according to the concept of the present invention are not limited to such specific embodiments, and it should be understood that the present invention includes all alterations, equivalents, and substitutes that fall within the idea and technical scope of the present invention.

It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

The terms used in the exemplary embodiment are provided only to explain specific embodiments, but are not intended to restrict the present invention. A singular representation may include a plural representation unless it represents a definitely different meaning from the context. It will be further understood that the terms "comprises", "has"

and the like, when used in the exemplary embodiment, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in the exemplary embodiment have the same meanings as those commonly understood by a person having ordinary skill in the art to which various exemplary embodiments of the present invention pertains. It will be further understood that terms, such as those defined in commonly used dictionaries, should be interpreted as having meanings consistent with their meanings in the context of the may relevant art and the present invention, and are not to be interpreted in an idealized or overly formal sense unless expressly so defined herein.

Reference will now be made in detail to the exemplary embodiments of the present invention, examples of which are illustrated in the accompanying drawings. Wherever possible, the same reference numbers will be used throughout the drawings to refer to the same or like parts.

A controller 40 and a warning generation unit 70 according to various exemplary embodiments of the present invention may be implemented by an algorithm configured to control the operation of various components of a vehicle, a non-volatile memory configured to store data on software commands that reproduce the algorithm, or a processor configured to perform the following operation using the data stored in the memory. Here, the memory and the processor may be implemented as individual chips. Alternatively, the memory and the processor may be implemented as an integrated chip. One or more processors may be provided.

Figure 2:
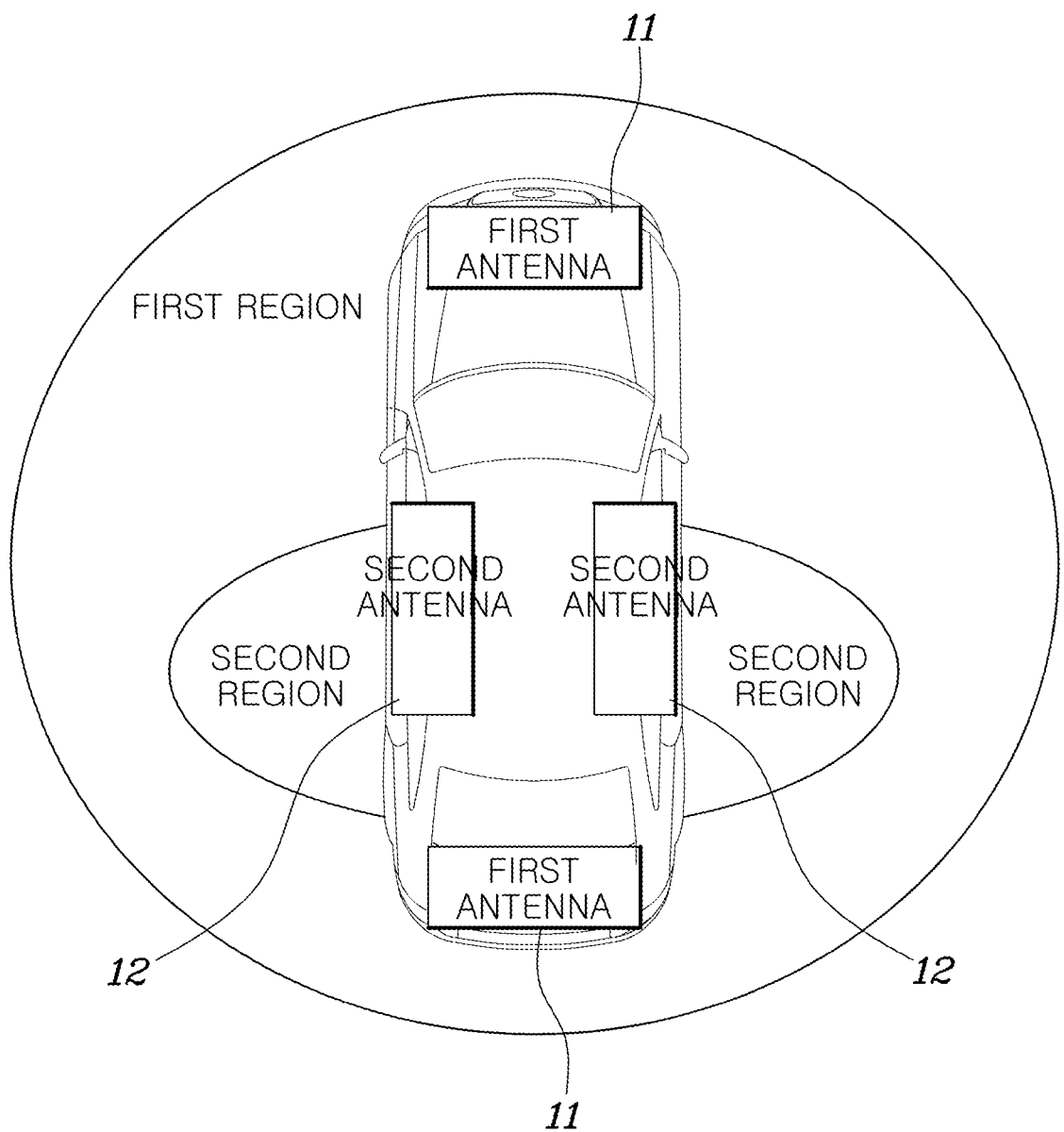
FIG. 2 is a view showing a region in which a mobile device is detected by an antenna according to various exemplary embodiments of the present invention.
Figure 3A:
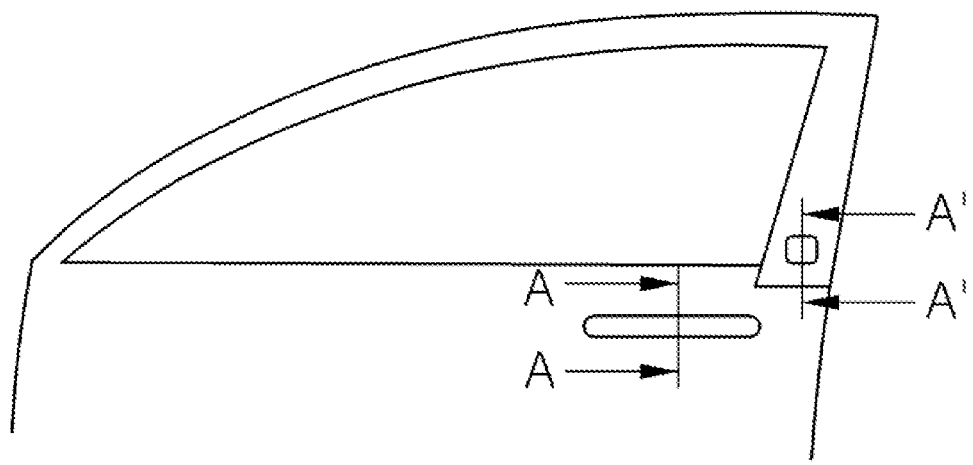
FIG. 3A and FIG. 3B are sectional views of a rain sensor according to various exemplary embodiments of the present invention.
Figure 3B:
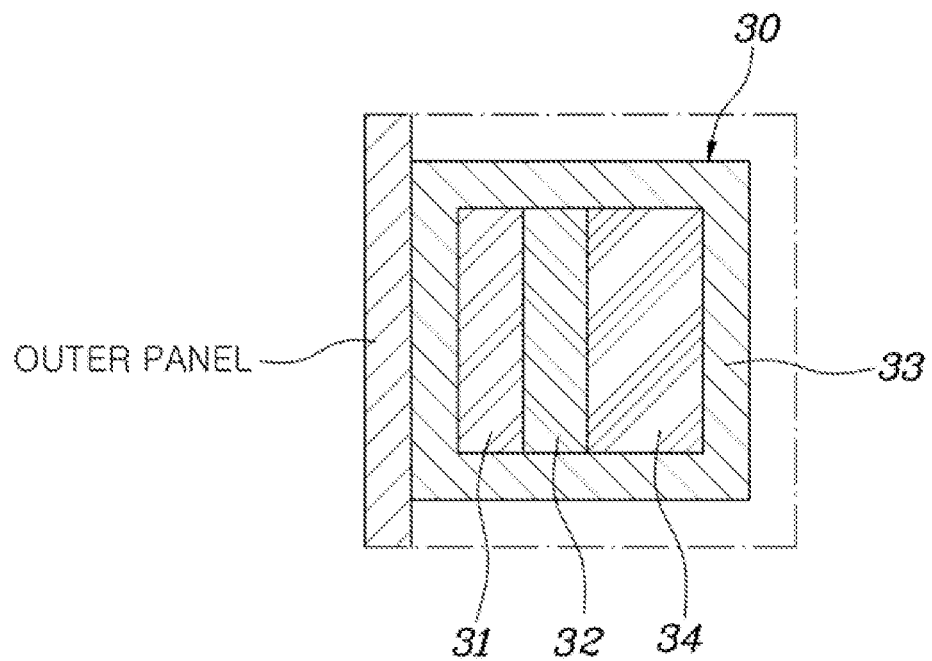

FIG. 1 is a view showing the construction of a vehicle door opening and closing control system according to various exemplary embodiments of the present invention, FIG. 2 is a view showing a region in which a mobile device 60 is detected by an antenna 10 according to various exemplary embodiments of the present invention, and FIG. 3A and FIG. 3B are sectional views of a rain sensor 30 according to various exemplary embodiments of the present invention.

An exemplary embodiment of the vehicle door opening and closing control system according to various exemplary embodiments of the present invention will be described with reference to FIG. 1, FIG. 2, FIG. 3A and FIG. 3B.

The vehicle door opening and closing control system according to various exemplary embodiments of the present invention is a system that recognizes a mobile device 60 when a passenger approaches a vehicle to open or close a vehicle door, whereby it is possible for the passenger to more conveniently board the vehicle.

The vehicle door opening and closing control system according to various exemplary embodiments of the present invention includes an antenna 10 provided at a vehicle, the antenna being configured to wirelessly communicate with a user's mobile device 60 to recognize the location of the user's mobile device 60, a door opening and closing device 20 configured to open or close a door of the vehicle, a rain sensor 30 configured to detect a rainy weather state outside the vehicle, and a controller 40 configured to control the operation of the door opening and closing device 20 based on the location of the mobile device 60 recognized by the antenna 10 or the rainy weather state outside the vehicle detected by the rain sensor 30.

The antenna 10 may be provided at the vehicle and may be constantly operated by a vehicle battery. When a passenger carrying the mobile device 60 approaches the vehicle, the antenna may wirelessly communicate with the mobile device to recognize the location of the passenger.

The rain sensor 30 may be mounted outside or inside the vehicle to detect a rainy weather state, and may detect a rainy weather state outside the vehicle through a camera mounted at the vehicle or a pressure sensor configured to detect vibration of raindrops.

Furthermore, the rain sensor 30 may detect a rainy weather state through a camera sensor provided at the vehicle or a touch sensor provided outside the vehicle, or may be a separate rainy weather sensing device provided outside the vehicle.

The door opening and closing device 20 may open or close the door, and may be driven by an electric motor or a hydraulic device. Furthermore, the door opening and closing device 20 may lock the door after closing the door.

The controller 40 may operate the door opening and closing device 20 depending on the location of the mobile device 60 detected by the antenna 10 to open or close the vehicle door.

A single antenna 10 may detect the location of the mobile device 60 in a plurality of divided regions, or a plurality of antennae 10 may be provided such that each antenna detects the location of the mobile device 60 in a corresponding one of the divided regions.

When the passenger approaches the vehicle in a state of carrying the mobile device 60, therefore, the antenna 10 wirelessly communicates with the mobile device 60 to recognize the location of the mobile device 60, and the controller 40 may operate the door opening and closing device 20 to open the door based on the location of the mobile device 60 recognized by the antenna 10.

Furthermore, when the passenger exits the vehicle in a state of carrying the mobile device 60, the controller 40 may close the open door and may lock the closed door.

As the door is automatically opened and closed, as described above, the passenger may feel convenience in boarding the vehicle. Furthermore, when the passenger boards the vehicle in a state of holding goods using both hands, the door may be automatically opened, whereby the passenger may conveniently load the goods in the vehicle.

Furthermore, when the rain sensor 30 detects a rainy weather state, the controller 40 may restrict opening of the door opening and closing device 20 to prevent the interior of the vehicle from getting wet.

The antenna 10 may include a first antenna 11 configured to recognize the mobile device 60 in a first region adjacent to the vehicle in all directions. When the mobile device 60 is recognized in the first region, the controller 40 may control the door opening and closing device 20 such that a door opening preparation mode of preparing the operation of the door opening and closing device 20 is executed.

As shown in FIG. 2, the first antenna 11 included in the antenna 10 may wirelessly communicate with the mobile device 60 in the first region adjacent to the vehicle in all directions to recognize that the mobile device 60 is located in the first region.

At the present time, the vehicle door may be closed. When the first antenna 11 recognizes that the mobile device 60 is located in the first region, the controller 40 may control the door opening and closing device 20 such that a door opening and closing preparation mode of preparing the operation of the door opening and closing device 20 is executed.

The door opening and closing device 20 may be operated by hydraulic pressure or an electric motor. In the door opening and closing preparation mode, preliminary pressure may be applied when the door opening and closing device 20 is operated by hydraulic pressure, and electric power may be applied to the electric motor such that the operation of the motor is provided when the door opening and closing device 20 is operated by the electric motor.

The antenna 10 may further include a second antenna 12 configured to recognize the mobile device 60 in a second region adjacent to the vehicle door. When the mobile device 60 is recognized in the second region, the controller 40 may control the door opening and closing device 20 so that the door is opened.

As shown in FIG. 2, the second antenna 12 may recognize the mobile device 60 in the second region adjacent to the vehicle door.

When the passenger approaches the vehicle door, therefore, the door opening and closing device 20 may be operated such that the door is automatically opened.

As shown in FIG. 2, the second region is included in the first region. When the mobile device 60 is recognized in the first region, the door opening and closing preparation mode may be executed. When the mobile device 60 is recognized in the second region, the door opening and closing device 20 may be immediately operated.

When the passenger is recognized in the second region in a state of carrying the mobile device 60, therefore, the door is immediately opened, and therefore it is not necessary for the passenger to wait for the vehicle door to open, whereby the passenger may feel convenience.

When the door remains open after a predetermined first time in the state in which the door is open, the controller 40 may control the door opening and closing device 20 so that the door is closed.

When the door is not closed but remains open after the predetermined first time in the state in which the vehicle door is open, the controller 40 may control the door opening and closing device 20 so that the door is closed.

Consequently, it is possible to prevent external foreign matter, such as dust, from being introduced into the vehicle.

Figure 5:
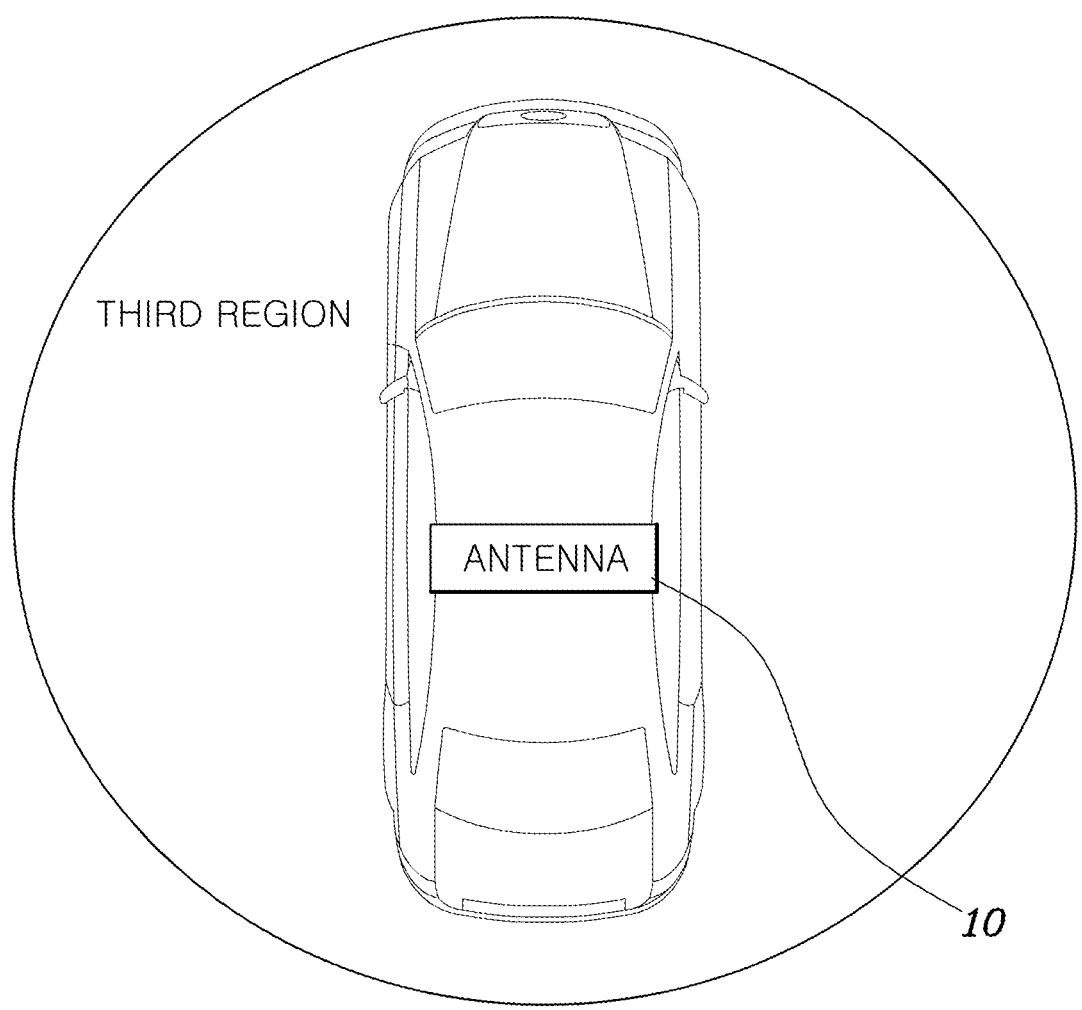
FIG. 5 is a view showing a region in which deviation of the mobile device is detected by the antenna according to the exemplary embodiment of the present invention.

FIG. 5 is a view showing a region in which deviation of the mobile device 60 is detected by the antenna 10 according to the exemplary embodiment of the present invention.

The antenna 10 may detect a third region around the vehicle. When the mobile device 60 is not recognized in the third region after a predetermined second time period in the state in which the door is open, the controller 40 may control the door opening and closing device 20 so that the door is closed.

When the mobile device 60 moves out of the third region in the state in which the door is open, whereby the mobile device 60 is not recognized in the third region, the controller 40 may control the door opening and closing device 20 so that the door is closed.

The third region may be set to be equal to the first region, to be larger than the first region, or to be smaller than the first region. That is, the sizes of the respective regions may be freely changed by a system designer.

Furthermore, when the rain sensor 30 detects a rainy weather state in the state in which the door is open, the controller 40 may control the door opening and closing device 20 so that the door is closed.

When the weather is changed to a rainy weather state in the state in which the vehicle door is open, therefore, the door may be immediately closed, whereby the interior of the vehicle is prevented from getting wet.

The vehicle door opening and closing control system may further include a warning generation unit 70 configured to generate a warning in the case in which the door remains open when the controller 40 performs control so that the door is closed.

In the case in which the door remains open due to an external obstacle after the controller 40 performs control so that the door is closed, the warning generation unit 70 may generate a warning signal.

The warning generation unit 70 may be connected to a speaker or a display device of the vehicle to audibly or visually generate a warning signal such that the passenger can remove the external obstacle and close the vehicle door.

The vehicle door opening and closing control system may further include a door locking device 50 configured to lock the vehicle door, and the antenna 10 may include a first antenna 11 configured to recognize the mobile device 60 in the first region adjacent to the vehicle in all directions. When the mobile device 60 is recognized in the first region, the controller 40 may control the door locking device 50 so that the door is unlocked.

The door locking device 50 may be integrated with the door opening and closing device 20. Alternatively, the door locking device 50 may be provided separately from the door opening and closing device 20.

When the first antenna 11 recognizes the mobile device 60 in the first region, the door locking device 50 may unlock the door.

Consequently, a passenger carrying no mobile device 60 may manually open the vehicle door.

Also, in the case in which the mobile device 60 is detected in the second region in the state in which the vehicle door is open, the door may be immediately opened.

In the case in which the rain sensor 30 detects a rainy weather state, the controller 40 may restrict the operation of the door opening and closing device 20.

In the state in which the mobile device 60 is recognized in the first region and the second region, the controller 40 may perform control so that the door is opened. In the case in which the rain sensor 30 detects a rainy weather state, however, the controller 40 may restrict the operation of the door opening and closing device 20 such that the door opening and closing device is not operated.

In the rainy weather state, therefore, the passenger may open the door and then immediately close the door, whereby the interior of the vehicle is prevented from getting wet.

As shown in FIG. 3A and FIG. 3B, the rain sensor 30 may include an electrode 31 configured to detect contact with raindrops in rainy weather and a circuit board 32 connected to the controller 40, the circuit board being configured to convert a signal of the electrode 31 into an electrical signal.

The electrode 31 included in the rain sensor 30 may measure capacitance changed by vibration generated due to impact of raindrops in rainy weather, and the circuit board 32 may determine a rainy weather state according to a signal of the changed capacitance.

The rainy weather is detected based on measurement of electrode capacitance $C_p$, and when raindrops fall, the electrode generates additional capacitance $C_f$ using a coupling effect. As a result, equivalent capacitance $C_p+C_f$ becomes greater than reference $C_p$. Consequently, it is possible to determine a rainy weather state.

As shown in FIG. 3A and FIG. 3B, the rain sensor 30 may be provided at a door catch (A-A) or a door frame (A'-A') of the vehicle. Alternatively, the rain sensor 30 may be mounted outside the vehicle excluding the door.

In the case in which contact with raindrops is continuously detected for a predetermined third time period after the electrode 31 detects contact with raindrops, the rain sensor 30 may detect that the current state is a rainy weather state.

As described above, the electrode 31 of the rain sensor 30 may detect change in capacitance for the predetermined third time, the circuit board 32 may determine the rainy weather state when the change in capacitance is detected for the predetermined third time or longer, and the controller 40 may control the door opening and closing device 20 such that opening of the door is restricted or the open door is closed.

As another exemplary embodiment of the present invention, in the case in which a threshold input to the rain sensor 30 due to raindrops in a rainy weather has a predetermined value and the threshold is input for the predetermined third time or longer, the rain sensor 30 may determine that the current state is a rainy weather state.

The rain sensor 30 may further include a sensor housing 33 in which the electrode 31 and the circuit board 32 are disposed, and the interior of the sensor housing 33 may be filled with a filler 34.

The electrode 31 and the circuit board 32 are disposed in the sensor housing 33, whereby the electrode 31 and the circuit board 32 are protected from external impact. Furthermore, since the interior of the sensor housing 33 is filled with the filler 34, it is possible to protect the electrode 31 and the circuit board 32 from external moisture.

The mobile device 60 may include an RF key of the vehicle, a smart key, or a smartphone, and the antenna 10 may include a personal identification device configured to recognize personal information of a passenger or a biometric identification device configured to recognize biometric information of a passenger.

The mobile device 60 may be an RF key of the vehicle, a smart key, or a smartphone, and the RF key of the vehicle, the smart key, or the smartphone may wirelessly communicate with the antenna 10 to recognize the location of the passenger.

FIG. 4 is a flowchart of a vehicle door opening and closing control method according to various exemplary embodiments of the present invention.

An exemplary embodiment of the vehicle door opening and closing control method according to various exemplary embodiments of the present invention will be described with reference to FIG. 4.

The vehicle door opening and closing control method according to various exemplary embodiments of the present invention includes a step (S10) of wirelessly communicating with a user's mobile device 60 to recognize the location of the user's mobile device 60, a step (S30) of detecting a rainy weather state outside a vehicle, and a step (S20) of controlling the operation of a door opening and closing device 20 based on the recognized location of the mobile device 60 or the rainy weather state outside the vehicle.

The step (S10) of recognizing the location of the mobile device 60 may include a step (S11) of recognizing the mobile device 60 in a first region adjacent to the vehicle in all directions. When the mobile device 60 is recognized in the first region, a step (S21) of releasing a door locking device 50 of the vehicle and controlling the door opening and closing device 20 to be in a door opening and closing preparation mode may be further included.

After the step (S21) of controlling the door opening and closing device 20 to be in the door opening and closing preparation mode, the step (S30) of detecting the rainy weather state outside the vehicle may be performed. When the rainy weather state outside the vehicle is detected, the step (S20) of controlling the operation of the door opening and closing device 20 may include a step (S22) of performing control such that opening of the door is restricted.

After the step (S21) of controlling the door opening and closing device 20 to be in the door opening and closing preparation mode, the step of recognizing the location of the mobile device 60 may include a step (S12) of recognizing the mobile device 60 in a second region adjacent to the door. When the mobile device 60 is recognized in the second region, the step of controlling the operation of the door opening and closing device 20 may include a step (S23) of performing control so that the door is opened.

After the step (S23) of performing control such that the door is opened, the step (S30) of detecting the rainy weather state outside the vehicle may be performed. When the rainy weather state outside the vehicle is detected, the step (S20) of controlling the operation of the door opening and closing device 20 may include a step (S24) of performing control such that the vehicle door is closed.

After the step (S23) of performing control such that the door is opened, a step (S40) of determining whether the door is open for a predetermined time period may be further included. In the case in which the door is open for the predetermined time period, the step (S20) of controlling the operation of the door opening and closing device may include a step (S24) configured to perform control such that the vehicle door is closed.

After the step (S24) of performing control so that the door is closed, the step (S40) of determining whether the door is open may be performed again. In the case in which the door is open for the predetermined time period, a step (S50) of generating a warning signal may be further included.

As is apparent from the above description, a vehicle door opening and closing control system according to various exemplary embodiments of the present invention has an effect in that a mobile device carried by a passenger wirelessly communicates with an antenna, and a door opening and closing device is controlled based on the location of the passenger such that a door is opened or closed, whereby convenience is provided when the passenger boards or exits the vehicle.

Furthermore, the vehicle door opening and closing control system according to various exemplary embodiments of the present invention has an effect in that a rainy weather state is detected, and the door opening and closing device is controlled based thereon to close the door in the state in which the door is open, whereby the interior of the vehicle is protected from raindrops.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle door opening and closing control system comprising:
    an antenna provided at a vehicle and configured to wirelessly communicate with a user's mobile device to recognize a location of the user's mobile device;
    a door opening and closing device configured to open or close a door of the vehicle;
    a rain sensor configured to detect a rainy weather state outside the vehicle; and
    a controller configured to control an operation of the door opening and closing device based on the location of the mobile device recognized by the antenna or the rainy weather state outside the vehicle detected by the rain sensor,
    wherein the rain sensor includes:
        an electrode detecting contact with raindrops in rainy weather; and
        a circuit board connected to the electrode and the controller and configured to convert a signal of the electrode into an electrical signal, and
    wherein the rain sensor further includes a sensor housing and the electrode and the circuit board are received inside the sensor housing, and
    wherein an inside of the sensor housing is filled with a filler.

2. The vehicle door opening and closing control system of claim 1, wherein
    the antenna includes a first antenna configured to recognize the mobile device in a first region adjacent to the vehicle in all directions of the vehicle, and
    when the mobile device is recognized in the first region by the first antenna, the controller is configured to control the door opening and closing device so that a door opening preparation mode of preparing operation of the door opening and closing device is executed.

3. The vehicle door opening and closing control system of claim 2, wherein
    the antenna further includes a second antenna configured to recognize the mobile device in a second region adjacent to the door of the vehicle, and
    when the mobile device is recognized in the second region by the second antenna, the controller is configured to control the door opening and closing device so that the door is opened.

4. The vehicle door opening and closing control system of claim 3, wherein, when the door remains open after a predetermined time period in a state in which the door is open, the controller is configured to control the door opening and closing device so that the door is closed.

5. The vehicle door opening and closing control system of claim 1, wherein
    the antenna is configured to detect a third region around the vehicle, and
    when the mobile device is not recognized in the third region after a predetermined time period in a state in which the door is open, the controller is configured to control the door opening and closing device so that the door is closed.

6. The vehicle door opening and closing control system of claim 3, wherein, when the rain sensor detects the rainy weather state in a state in which the door is open, the controller is configured to control the door opening and closing device so that the door is closed.

7. The vehicle door opening and closing control system of claim 4, further including a warning generation unit configured to generate a warning in a case in which the door remains open when the controller performs control so that the door is closed.

8. The vehicle door opening and closing control system of claim 1, further including:
    a door locking device configured to selectively lock the door of the vehicle,
    wherein the antenna includes a first antenna configured to recognize the mobile device in a first region adjacent to the vehicle in all directions of the vehicle, and
    wherein when the mobile device is recognized in the first region by the first antenna, the controller is configured to control the door locking device so that the door is unlocked.

9. The vehicle door opening and closing control system of claim 1, wherein, when the rain sensor detects the rainy weather state, the controller is configured to restrict the operation of the door opening and closing device.

10. The vehicle door opening and closing control system of claim 1, wherein, when contact with raindrops is continuously detected for a predetermined time period after the electrode starts to detect contact with the raindrops, the controller is configured to conclude that the rainy weather state occurs.

11. The vehicle door opening and closing control system of claim 1, wherein the mobile device includes a radio frequency (RF) key of the vehicle, a smart key, or a smartphone.

12. A method of controlling the vehicle door opening and closing control system of claim 1, the method including:
- wirelessly communicating, by the antenna, with the user's mobile device to recognize the location of the user's mobile device;
- detecting, by the rain sensor, the rainy weather state outside the vehicle; and
- controlling, by the controller, the operation of the door opening and closing device based on the recognized location of the mobile device or the rainy weather state outside the vehicle.

13. The method of claim 12,
wherein the antenna includes a first antenna, and
wherein the recognizing the location of the mobile device includes recognizing the mobile device in a first region adjacent to the vehicle in all directions of the vehicle, and
when the mobile device is recognized in the first region by the first antenna, the method further includes releasing a door locking device of the vehicle and controlling the door opening and closing device to be in a door opening and closing preparation mode.

14. The method of claim 13, wherein
after the controlling the door opening and closing device to be in the door opening and closing preparation mode, the detecting the rainy weather state outside the vehicle is performed, and
when the rainy weather state outside the vehicle is detected, the controlling the operation of the door opening and closing device includes performing control so that opening of the door is restricted.

15. The method of claim 13,
wherein the antenna further includes a second antenna, and wherein
after the controlling the door opening and closing device to be in the door opening and closing preparation mode, the recognizing the location of the mobile device includes recognizing the mobile device in a second region adjacent to the door, and
when the mobile device is recognized in the second region by the second antenna, the controlling the operation of the door opening and closing device includes performing control so that the door is opened.

16. The method of claim 15, wherein
after the performing control so that the door is opened, the detecting the rainy weather state outside the vehicle is performed, and
when the rainy weather state outside the vehicle is detected, the controlling the operation of the door opening and closing device includes performing control so that the door of the vehicle is closed.

17. The method of claim 15, wherein
after the performing the control so that the door of the vehicle is opened, the method further includes determining whether the door is open for a predetermined time period, and
when the door is open for the predetermined time period, the controlling the operation of the door opening and closing device includes performing control so that the door of the vehicle is closed.

18. The method of claim 17, wherein
after the step of performing control so that the door is closed, the determining whether the door is open is performed again, and
when the door is open for the predetermined time period, the method further includes generating a warning signal.

* * * * *